United States Patent
Morawski et al.

[15] 3,707,292
[45] Dec. 26, 1972

[54] MULTI-JAW CHUCK

[72] Inventors: London T. Morawski, Mt. Clemens; John J. Parker, Warren, both of Mich.

[73] Assignee: The John J. Parker Living Trust, by said Parker

[22] Filed: Dec. 24, 1970

[21] Appl. No.: 101,210

[52] U.S. Cl. .....................279/110, 279/60, 279/123
[51] Int. Cl. .............................................B23b 31/10
[58] Field of Search................279/60, 110, 119, 123

[56] References Cited

UNITED STATES PATENTS 3,248,122  4/1966  Roddy................................279/110

*Primary Examiner*—Francis S. Husar
*Attorney*—Barnes, Kisselle, Raisch & Choate

[57] ABSTRACT

A chuck having a plurality of jaw carrying rods slidably arranged within bores inclined relative to the chuck axis. The rods may be axially shifted in opposite directions to thereby increase and decrease the diameter of the circle defined by the jaws for gripping and releasing the peripheral surface of a workpiece. The rods are insertable and removable from the front of the chuck and after insertion are operatively connected to an actuator slide within the chuck by rotary indexing of the rods within their respective bores.

6 Claims, 5 Drawing Figures

INVENTORS
LONDON T. MORAWSKI
JOHN J. PARKER

BY
Barnes, Kisselle, Raisch & Choate
ATTORNEYS

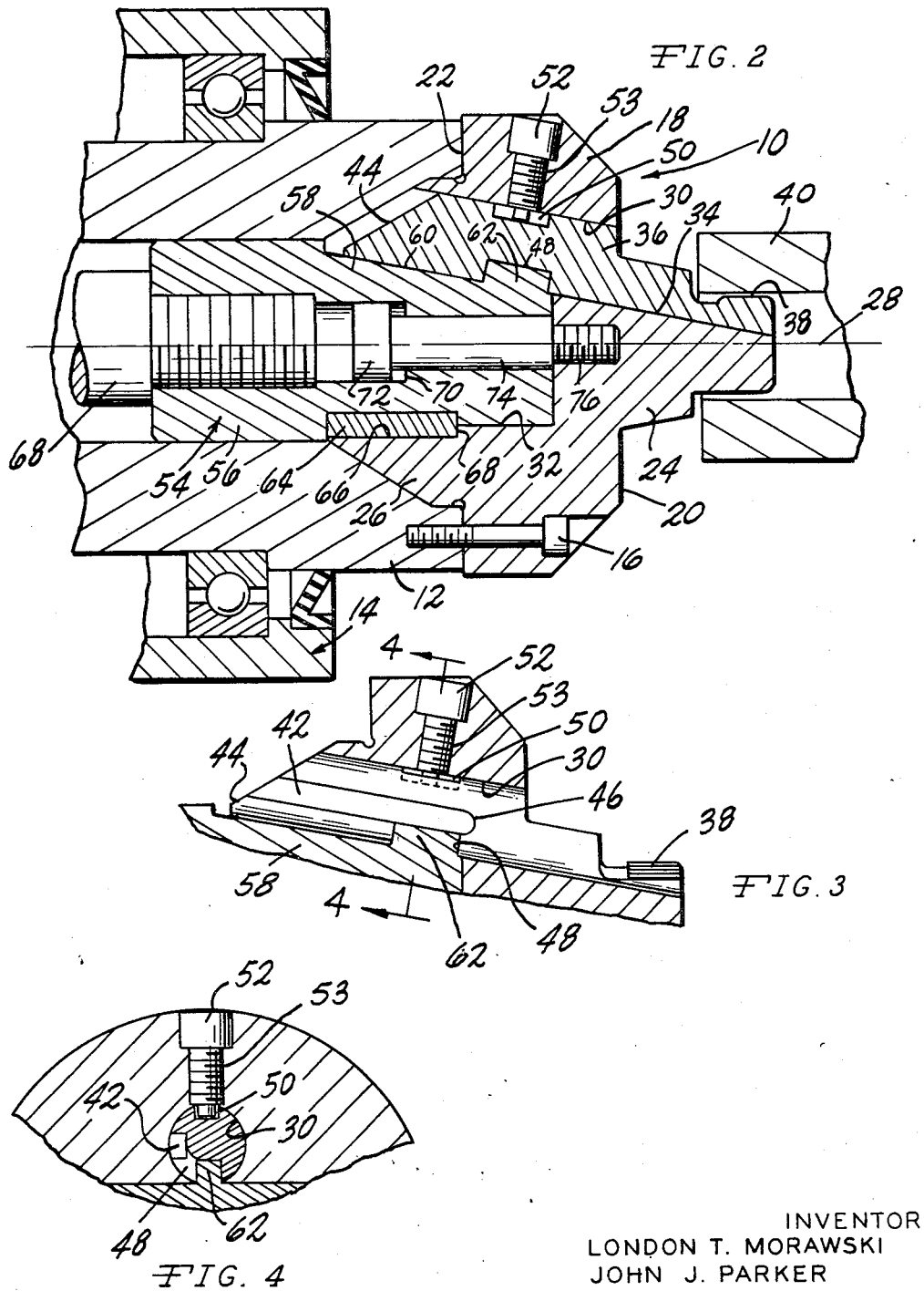

MULTI-JAW CHUCK

This invention relates to chucks and particularly to multi-jaw chucks of the drawbar type especially adapted for holding castings and forgings.

When a chuck of this type is used with a machine tool such as a lathe it is often necessary to replace the entire chuck when a different sized workpiece is being machined since the chuck jaws are not readily replaceable.

It is therefore the principal object of this invention to provide a multi-jaw chuck in which the jaws may be readily replaced from the front of the chuck.

Another important object of this invention is the provision of a multi-jaw chuck of simple yet rigid construction having replaceable chuck jaws which are operatively connected to a jaw actuator by means of a key and notch arrangement.

Other features and objects of the invention will become apparent from the accompanying description and drawings in which:

FIG. 2 is a sectional view taken along line 2—2 in FIG. 1.

FIG. 3 is a view similar to a portion of FIG. 2 and showing additional features therein.

FIG. 4 is a sectional view taken along line 4—4 in FIG. 3.

Figure 1:
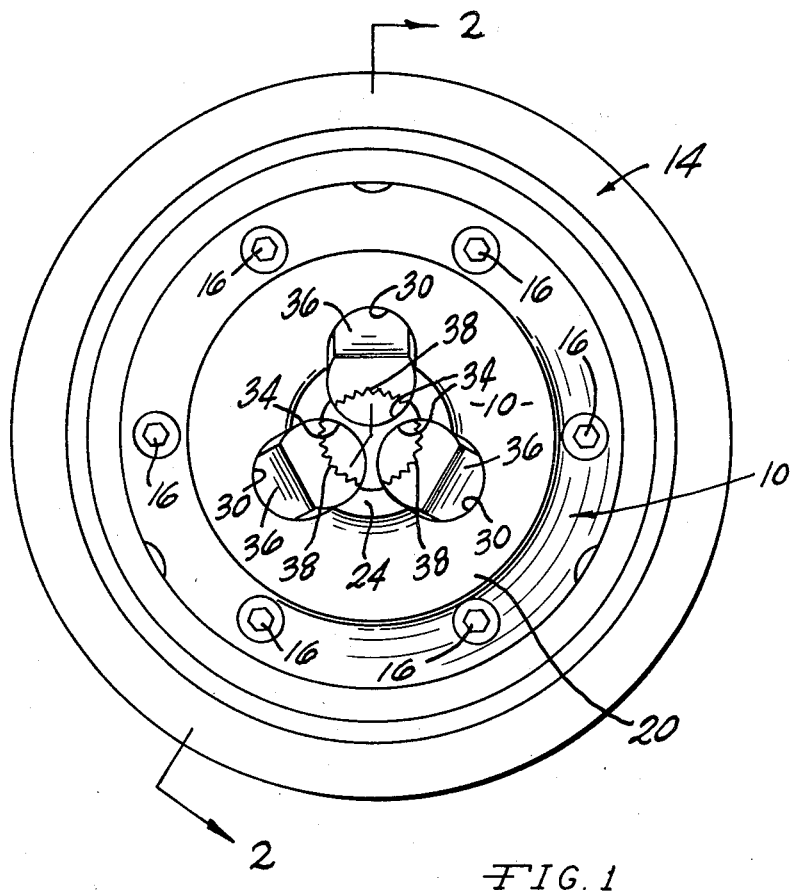
FIG. 1 is a front view of a multi-jaw chuck of the present invention mounted on a machine tool spindle.

Referring to FIGS. 1 and 2 there is shown a chuck 10 of the present invention mounted on a spindle or spindle adaptor 12 of a machine tool 14 by means of circumferentially spaced attaching bolts 16. Chuck 10 comprises a body 18 having a front face 20 and a rear face 22. A forward extension 24 projects forwardly of front face 20 while a rear extension 26 projects rearwardly from face 22 so as to seat body 18 concentrically with the spindle axis 28.

A plurality of three circular bores 30 are arranged in body 18. When viewed from the front of the chuck, bores 30 are circumferentially equally spaced about axis 28. Bores 30 extend rearwardly from face 20 through body 18 and are similarly inclined radially outwardly in the rearward direction. Body 18 is also provided with a central axial bore 32 extending forwardly through rear extension 26 so as to communicate with the rearward portions of bores 30. A plurality of three arcuate grooves 34 are formed in forward extension 24 as continuations of bores 30.

Slidably arranged within each inclined bore 30 is a jaw rod 36. The rear portion of jaw rod 36 is cylindrical in shape so as to have a close sliding fit within bore 30. As better shown in FIG. 3, the front portion of rod 36 carries serrations 38 for gripping a workpiece 40. Rod 36 is also provided with a slot 42 which extends lengthwise from rear end 44 of the rod for approximately half its length, terminating as at 46.

Referring also to FIG. 4, a notch 48 in rod 36 extends arcuately approximately 90° about the rod axis adjacent termination 46 of slot 42. A short slot 50 in the radially outward surface of rod 36 receives the end of a pin 52 inserted through a hole 53 in body 18.

Figure 5:
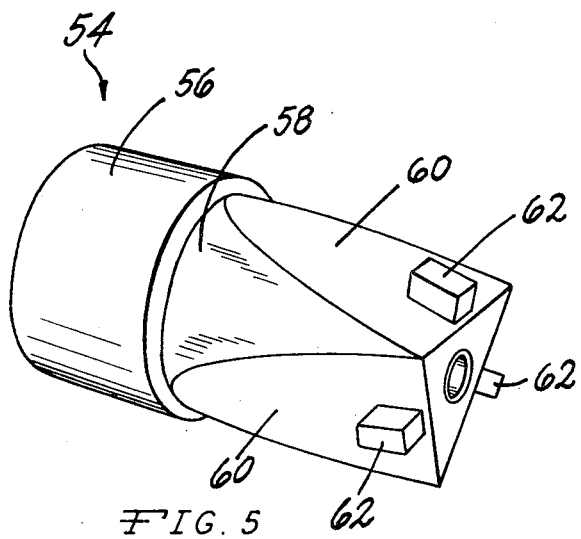
FIG. 5 is a perspective view of the actuator slide of the present invention.

An actuator slide 54 is arranged within bore 32 for imparting motion to jaw rods 36. As better shown in FIG. 5, slide 54 comprises a cylindrical slide body 56 having a shank 58 extending forwardly from body 56. A plurality of three flats 60 are machined on shank 58 at similar inclinations relative to axis 28. Centrally located at the forward end of each flat 60 is a key 62 which projects radially outwardly so as to extend into notch 48 on rod 36 when the jaw rods are operatively installed in the chuck. An axially extending key 64 on slide 54 engages a keyway 66 in body 18 so as to prevent rotation therebetween. Slide 54 is actuated by a drawbar 68 on machine tool 14, the forward motion of the slide being limited by the engagement of key 64 with shoulder 68 on body 18, and the rearward motion by the engagement of stop 70 with head 72 of bolt 74 which is affixed to body 18 as at 76.

With chuck 10 mounted on spindle 12 jaw rods 36 are expeditiously inserted therein by the following steps:

Rear end 44 of rod 36 is inserted into the front of bore 30 with slot 42 facing radially inwardly for alignment with key 62. The engagement of key 62 with slot 42 allows rod 36 to be inserted until notch 48 is adjacent key 62. Rod 36 is then indexed, that is, rotated about the axis of bore 30, 90° in the clockwise direction as viewed in FIG. 4. Key 62 is now engaged by notch 48 so as to render rod 36 operatively connected with actuator slide 54. Pin 52 is then threaded into hole 53 so that its inner end projects into slot 50. The length of slot 50 is sufficient to allow shifting of rod 36 between an engaged position and a disengaged position relative to the workpiece while the width of slot 50 permits a slight rotation of rod 36 about its axis to thereby enable the serrated jaw portion 38 to accommodate slight surface irregularities in the workpieces.

In order to bring jaw rods 36 to the work engaging position, slide 54 is shifted to the left as viewed in FIG. 2. This causes rods 36 to move axially rearwardly and radially outwardly so that serrations 38 engage the inner circumference of workpiece 40. In order to release the workpiece, slide 54 is returned to the right as viewed in FIG. 2.

Whenever it is desired to change jaw rods 36 the aforementioned installation procedure is reversed, and a change of jaws can be accomplished in a short time with a minimum amount of effort. Even though the chuck incorporates this quick jaw change features the construction remains very sturdy since jaw rods 36 are supported by body 18 and extension 24.

It will be appreciated that modifications may be made to the preferred embodiment as disclosed which are still within the scope of this invention. For example, to enable the chuck to grip workpieces around the outer surface thereof rather than around an inner surface, inclined bores 30 could be inclined radially inwardly in the rearward direction with slide 54 being shifted to the right as viewed in FIG. 2 to shift the rods to the work engaging position. In another variation, keys could be formed on jaw rods 36 which are indexed to engage notches in slide 54. In this case, keyways could be formed in bores 30 for receiving the jaw rod keys as jaw rods 36 are inserted through the front of the chuck. A notch would be provided adjacent each keyway so that when jaw rod 36 is indexed relative to bore 30, the key is brought into locking engagement with the notch in slide 54.

We claim:

1. A chuck adapted to be mounted on a rotary spindle of a machine tool for retaining a workpiece thereon comprising a body having an axis coaxial with the spindle axis, a plurality of bores in said body similarly inclined relative to the body axis and extending rearwardly from the front of the chuck, axially shiftable actuating means adapted to be operatively connected to means on said machine tool for reciprocating said actuating means, a jaw rod slideably arranged within each of said inclined bores, said jaw rods being insertable into said inclined bores from the front of said chuck, said body including a central axial bore extending forwardly from the rear of said body with the rearward ends of the inclined bores communicating with said central bore, said actuating means being axially shiftable in said central bore, each of said jaw rods having a slot extending lengthwise from the rear end thereof and a notch therein spaced axially from the rear end of the rod and circumferentially adjacent said slot, a radially outwardly extending key on said actuating means associated with each jaw rod, each of said jaw rods being adapted to be rotated so as to radially align the slot therein with its respective key on the actuating means to enable insertion of each jaw rod into its inclined bore and thereafter rotatably indexed to engage the notch with said key so as to interengage said actuating means with each jaw rod so that when the actuating means is axially shifted in said central bore the jaw rods are shifted in their inclined bores.

2. The combination called for in claim 1 and including additional means for releasably locking said key and notch in interengaged position.

3. The combination called for in claim 1 including a second axially extending slot in said jaw rod and a pin projecting from said body into said last-mentioned slot for limiting the rotation of said jaw rod within said inclined bore while permitting axial movement thereof.

4. The combination called for in claim 1 wherein said notch is located adjacent the forward end of the slot in each jaw rod.

5. A chuck adapted to be mounted on a rotary spindle of a machine tool for retaining a workpiece thereon comprising a body having an axis coaxial with the spindle axis, a plurality of bores in said body similarly inclined relative to the body axis and extending rearwardly from the front of the chuck, axially shiftable actuating means adapted to be operatively connected to means on said machine tool for reciprocating said actuating means, a jaw rod slideably arranged within each of said inclined bores, said jaw rods being insertable into said inclined bores from the front of said chuck, said actuating means having a plurality of radially outwardly extending keys thereon associated one with each of said jaw rods, means on each of said jaw rods forming a recess on the outer periphery thereof to provide a clearance space with said inclined bore which extends lengthwise of the bore and has a radial extent at least equal to the extent to which the key on the actuating means projects radially into said inclined bores whereby to permit said jaw rods to be inserted into said inclined bores when the jaw rods are oriented to radially align said clearance spaces with said keys and means on said jaw rods enabling the jaw rods to be rotated after insertion in said inclined bores to relatively shift said keys out of radial registration with said clearance spaces to interlock the jaw rods and the actuating means for lengthwise movement together so that when said actuating means is axially shifted the jaw rods are shifted axially within said inclined bores.

6. The combination called for in claim 5 wherein said last-mentioned means comprises means forming a circumferentially extending recess on the outer periphery of each jaw rod communicating with said lengthwise extending recess and sized to receive said keys upon rotation of the jaw rod in its respective inclined bore.

* * * * *